United States Patent
Barkan et al.

(10) Patent No.: US 12,380,297 B2
(45) Date of Patent: Aug. 5, 2025

(54) FULL SENSOR UTILIZATION OVER MULTIPLE FIELDS OF VIEW

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 19 days.

(21) Appl. No.: 18/375,231

(22) Filed: Sep. 29, 2023

(65) Prior Publication Data
US 2025/0111181 A1    Apr. 3, 2025

(51) Int. Cl.
*G06K 7/10* (2006.01)
*G06K 7/14* (2006.01)

(52) U.S. Cl.
CPC ..... *G06K 7/10722* (2013.01); *G06K 7/10831* (2013.01); *G06K 7/1413* (2013.01)

(58) Field of Classification Search
CPC .................. G06K 7/10722; G06K 7/10831
USPC .................................................. 235/462.41
See application file for complete search history.

(56) References Cited

U.S. PATENT DOCUMENTS

| | | | |
|---|---|---|---|
| 10,830,703 B1 * | 11/2020 | Almogy ................. | G01N 21/65 |
| 2012/0118963 A1 * | 5/2012 | Drzymala .......... | G06K 7/10722 |
| | | | 235/454 |
| 2013/0068840 A1 * | 3/2013 | Kearney ............ | G06K 7/10613 |
| | | | 235/462.14 |

* cited by examiner

*Primary Examiner* — Toan C Ly
(74) *Attorney, Agent, or Firm* — Yuri Astvatsaturov (57) ABSTRACT

Embodiments of the present disclosure are directed to imaging systems operable to capture image data representative of varying wavelength ranges from separate fields of view (FOVs). In some examples this is achieved by utilizing a statically positioned mirror arrangement positioned within a path of an imager's FOV and operative to (i) reflect light in a first wavelength range forming a first sub-FOV and (ii) pass therethrough light in a second wavelength range forming a second sub-FOV. Each of the first sub-FOV and the second sub-FOV can then be routed along a respective predetermined path to enable the imager to capture image data representative of the light sensed from each respective sub-FOV.

12 Claims, 6 Drawing Sheets

FULL SENSOR UTILIZATION OVER MULTIPLE FIELDS OF VIEW

BACKGROUND

Multi-field of view (FOV) indicia readers are a common among indicia readers, particularly those used in retail environments. Devices like bi-optic indicia readers often employ multiple FOVs to help capture an image of sufficient quality of an indicium largely irrespective of how it is positioned relative to the reader. To achieve this, indicia readers often use splitter and fold mirrors to split a primary FOV associated with one image sensor into multiple FOVs. As a result, the entire pixel area of a sensor cannot be used. A solution to this problem involves using a separate image sensor for every desired FOV. However, such design may be costly, due to the need for additional sensors, and difficult to implement due to the design complexity if positioning all necessary image sensors in their appropriate locations and electrically interfacing them. Another solution involves adding movable mirrors which allow for dynamic FOVs. This, however, adds mechanical complexity, driving up cost and reducing robustness and reliability. Thus, there exists a need for continued design improvements that would allow for the use of an entire image sensor for multiple FOVs.

SUMMARY

Accordingly, at least some embodiments of the present disclosure relate to design improvements in the area of indicia readers and other machine vision devices that would allow for the use of an entire image sensor for multiple FOVs.

In an embodiment, the present invention is an indicia-reading apparatus comprising: a housing; an imaging assembly positioned within the housing, the imaging assembly having an imaging sensor, the imaging assembly further having associated therewith a field of view (FOV) which is projected onto an area of the imaging sensor such that the imaging sensor is operative to capture image data representative of light that impinges on the area of the imaging sensor, the imaging sensor configured to capture the image data responsive to sensing light in a first wavelength range and in a second wavelength range; and a mirror arrangement configured to redirect at least some portion of the FOV, the mirror arrangement including a first mirror and a second mirror, the mirror arrangement being a statically positioned mirror arrangement, wherein the first mirror is a dichroic mirror operative to reflect light in the first wavelength range and pass therethrough light in the second wavelength range, and wherein the second mirror is operative to reflect light in the second wavelength range.

In a variation of this embodiment, the indicia-reading apparatus is selectively operable in one of a suspended mode and a reading mode, wherein indicia-reading apparatus is configured to transition from the suspended mode to the reading mode based analyzing image data captured in response to sensing the light in the first wavelength range. In the suspended mode at least one of an illumination assembly and the imaging assembly operates at a reduced functionality than in the reading mode.

In another embodiment, the present invention is an image capture system for performing at least one machine vision operation on captured image data, the image capture system comprising: a housing; an imaging assembly positioned within the housing, the imaging assembly having an imaging sensor, the imaging assembly further having associated therewith a primary FOV which is projected onto an area of the imaging sensor such that the imaging sensor is operative to capture image data representative of light that impinges on the area of the imaging sensor, the imaging sensor configured to capture the image data responsive to sensing light in a first wavelength range and in a second wavelength range, the primary FOV having a vertical angle and a horizontal angle; and a mirror arrangement including a first mirror positioned within a path of the primary FOV and operative to (i) reflect light in the first wavelength range forming a first sub-FOV and (ii) pass therethrough light in the second wavelength range forming a second sub-FOV, wherein each of a vertical angle of the first sub-FOV and a vertical angle of the second sub-FOV is the same as the vertical angle of the primary FOV, and wherein each of a horizontal angle of the first sub-FOV and a horizontal angle of the second sub-FOV is the same as the horizontal angle of the primary FOV.

In a variation of this embodiment, the image capture system is selectively operable in one of a suspended mode and a reading mode, and indicia-reading apparatus is configured to transition from the suspended mode to the reading mode based analyzing image data captured in response to sensing the light in the first wavelength range. In the suspended mode at least one of an illumination assembly and the imaging assembly operates at a reduced functionality than in the reading mode.

In still another embodiment, the present invention is an indicia-reading apparatus comprising: a housing having a first window and a second window; an imaging assembly positioned within the housing, the imaging assembly having an imaging sensor, the imaging assembly further having associated therewith an FOV which is projected onto an area of the imaging sensor such that the imaging sensor is operative to capture image data representative of light that impinges on the area of the imaging sensor, the imaging sensor configured to capture the image data responsive to sensing light in a first wavelength range and in a second wavelength range; and a mirror arrangement configured to (i) direct at least some light passing through the first window at a first area of the imaging sensor and (ii) direct at least some light passing through the second window at a second area of the imaging sensor, the first area of the imaging sensor and the second area of the imaging sensor at least partially overlapping, wherein the at least some light passing through the first window that is directed at the first area of the imaging sensor is in the first wavelength range and the at least some light passing through the second window that is directed at the second area of the imaging sensor is in the second wavelength range.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As used herein, the term "indicia" should be understood to refer to any kind of visual marker that can be associated with an item or a transaction. For example, indicia can be a 1D, 2D, or 3D barcode, a graphic, a logo, etc. Additionally, indicia may comprise encoded payload data as, for example, is the case with a 1D or 2D barcode where the barcode encodes a payload comprised of, for example, alphanumeric or special characters that may be formed into a string.

Figure 1:
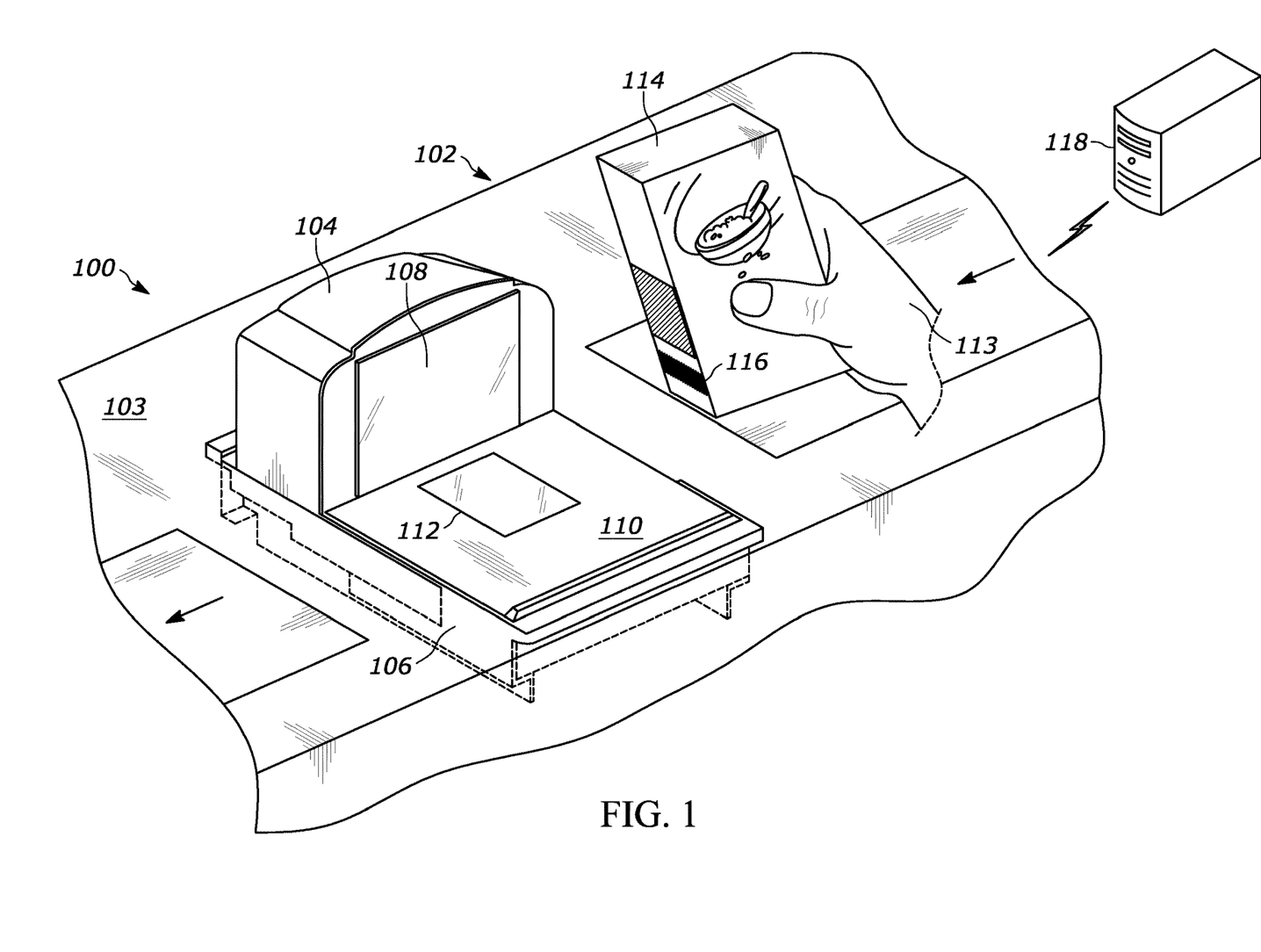
FIG. 1 is a perspective view of an example indicia reader that may be used to implement inventive concepts described here.

It has been recognized that strategically placed dichroic mirrors used in connection with multiple illumination assemblies which emit illumination light of different wavelengths can allow for a statically positioned optical system (not considering the possibility of variable focus lens assemblies) to make use of the same area of an image sensor for separate fields of view (FOVs). At a higher level, embodiments described herein may be used in any variety of indicia readers or other machine vision devices. For example, FIG. 1 illustrates an exemplary bioptic indicia reader that may be used in a retail venue, where said reader may employ the concepts described herein. In the illustrated example, the bioptic indicia reader 100 is shown as part of a point-of-sale (POS) system arrangement 102 having the bioptic indicia reader 100 positioned within a workstation counter 103. Generally, the indicia reader 100 includes an upper housing 104 (also referred to as an upper portion, upper housing portion, or tower portion) and a lower housing 106 (also referred to as a lower portion, lower housing portion, or platter portion). The upper housing 104 can be characterized by an optically transmissive window 108 positioned therein along a generally vertical plane and one or more field of view (FOV) which passes through the window 108 and extends in a generally lateral direction. The lower housing 106 can be characterized by a weigh platter 110 or a cover that includes an optically transmissive window 112 positioned therein along a generally horizontal (also referred to as a transverse) plane and one or more FOV which passes through the window 112 and extends in a generally upward direction. The weigh platter 110 is a part of a weigh platter assembly that generally includes the weigh platter 110 and a scale (or load cell) configured to measure the weight of an object placed the top surface of the weight platter 110. By that virtue, the top surface of the weight platter 110 may be considered to be the top surface of the lower housing 106 that faces a product scanning region there above.

In operation, a user 113 generally passes an item 114 across a product scanning region of the indicia reader 100 in a swiping motion in some general direction, which in the illustrated example is right-to-left. A product scanning region can be generally viewed as a region that extends above the platter 110 and/or in front of the window 108 where barcode reader 100 is operable to capture image data of sufficient quality to perform imaging-based operations like decoding a barcode that appears in the obtained image data. It should be appreciated that while items may be swiped past the indicia reader 100 in either direction, items may also be presented into the product scanning region by means other than swiping past the window(s). When the item 114 comes into the any of the fields of view of the reader, the indicia 116 on the item 114 is captured and decoded by the indicia reader 100, and corresponding data (e.g., the payload of the indicia) is transmitted to a communicatively coupled host 118 (commonly comprised of a point of sale (POS) terminal).

Figure 2:
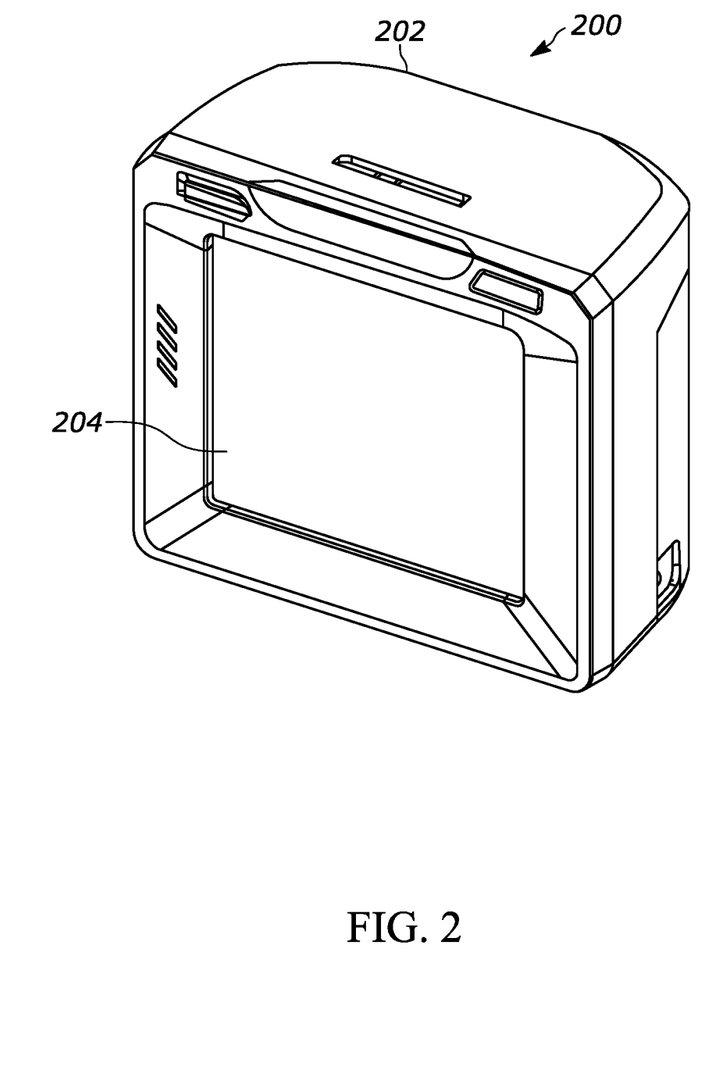
FIG. 2 is a perspective view of another example barcode reader that may be used to implement inventive concepts described here.

FIG. 2 illustrates another example of an indicia reader, sometimes referred to as a slot scanner. In the example shown, indicia reader 200 has a housing 202 and a window 204, which faces a product scanning region, to allow a set of optical components positioned within housing 202 to direct at least one field-of-view through window 204. Indicia reader 200 operates on a similar principle as the reader 100 of FIG. 1. However, it is generally smaller (typically having a window that is smaller than 5 inches across), includes a single window, and, while it could be installed in a slot of a counter (functioning like the bottom portion of the reader 100), it can also be used as a stationary scanner positioned on a working surface (functioning like the upper portion of the reader 100).

Figure 3:
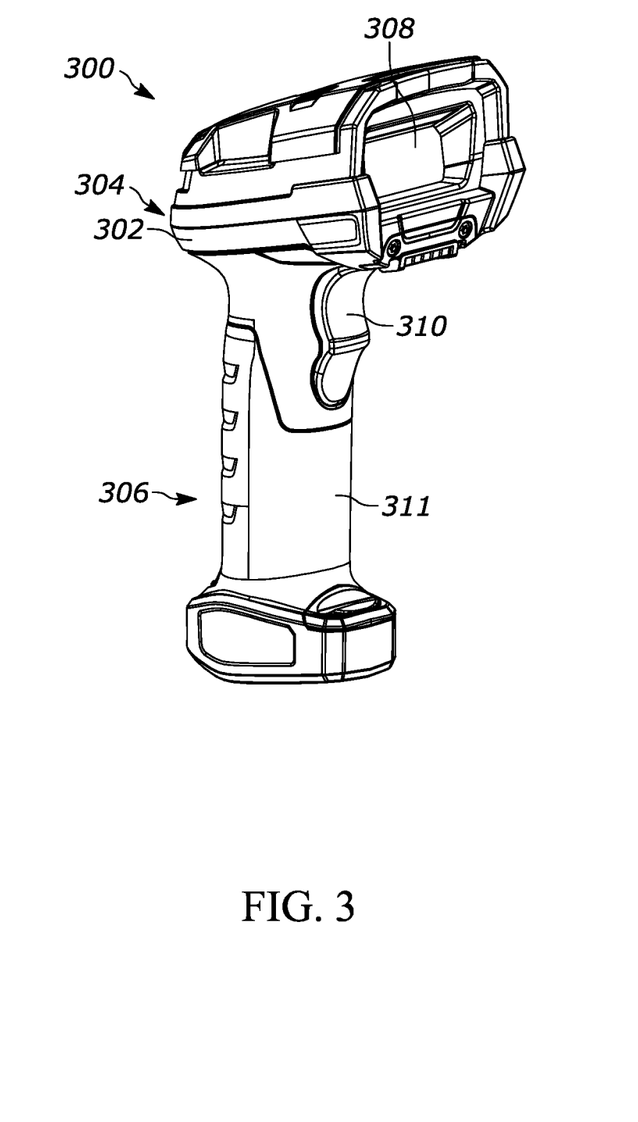
FIG. 3 is a perspective view of another example barcode reader that may be used to implement inventive concepts described here.

FIG. 3 illustrates yet another example of an indicia reader 300, sometimes referred to as a handheld indicia reader. Reader 300 generally includes a housing 302 that is comprised of a head portion 304 and a bottom portion 306. The head portion 304 houses at least some optoelectrical components for capturing relevant image data along a FOV that extends through a window 308. The bottom portion 306 typically includes a handle portion 309 and a trigger 310. In operation, a user typically grasps the handle portion 311 and points the reader 300 in a general direction of the indicia that is to be read. If the reader is configured to be activated with the activation of the trigger 310, subsequent to the user squeezing the trigger 310, reader 300 captures relevant image data and processes it accordingly.

While it will be appreciated that concepts described herein may be used in connection with any of the indicia reader embodiments described above, this should not be considered limiting and it should be understood that other form factors of indicia readers and imaging-based devices could be employed.

As noted previously, a need for utilizing the same area of an image sensor to collect image data over multiple FOVs has been identified. To address this, the present disclosure presents novel concepts which leverage the use of one or more dichroic mirrors positioned within optical paths of certain imaging assemblies along with illumination assembly(ies) operable to emit illumination of differing wavelengths.

Figure 4A:
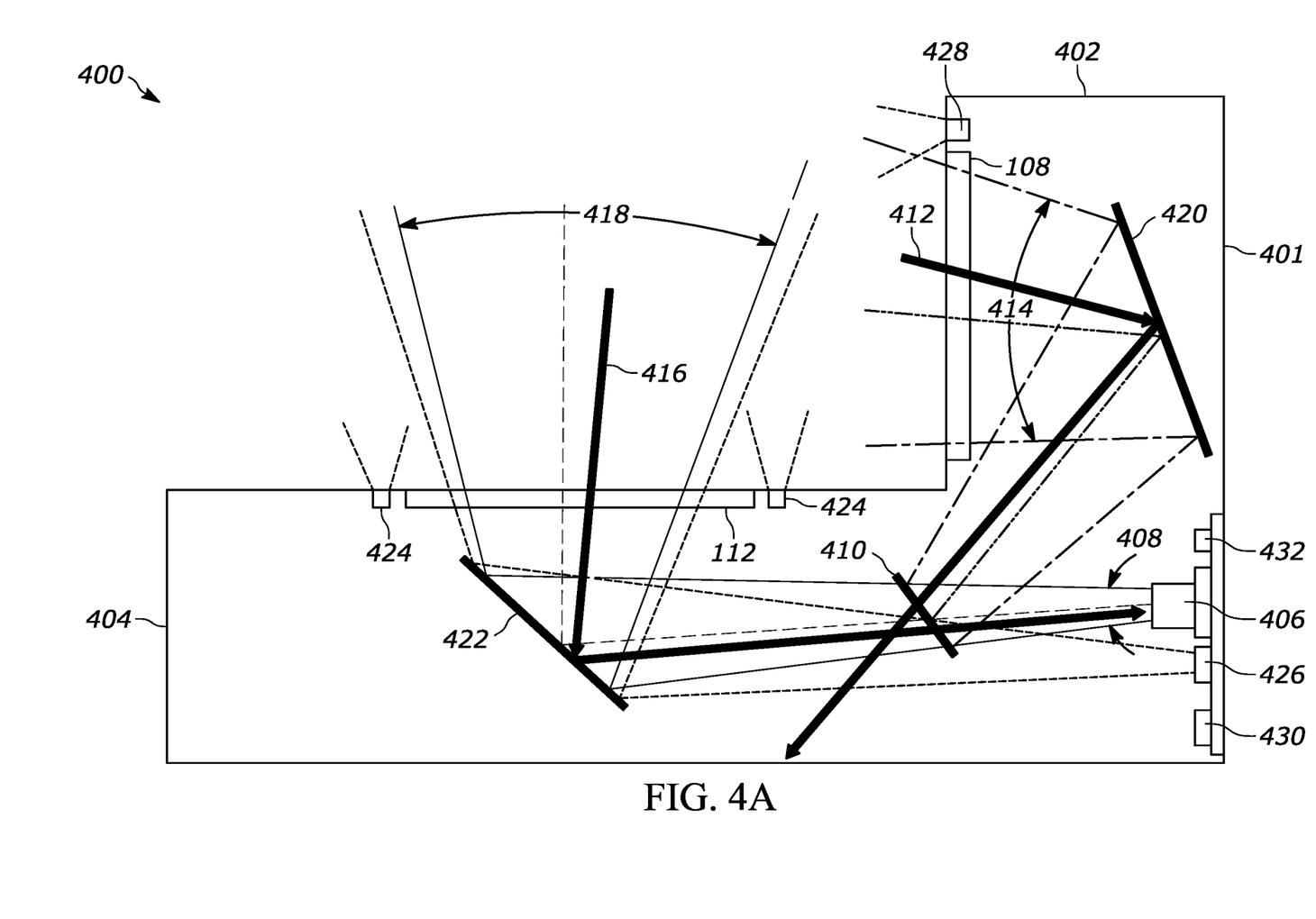
FIGS. 4A and 4B illustrate a side cross-section block diagram of an example bi-optic indicia reader in accordance with embodiments of the present disclosure.
Figure 4B:
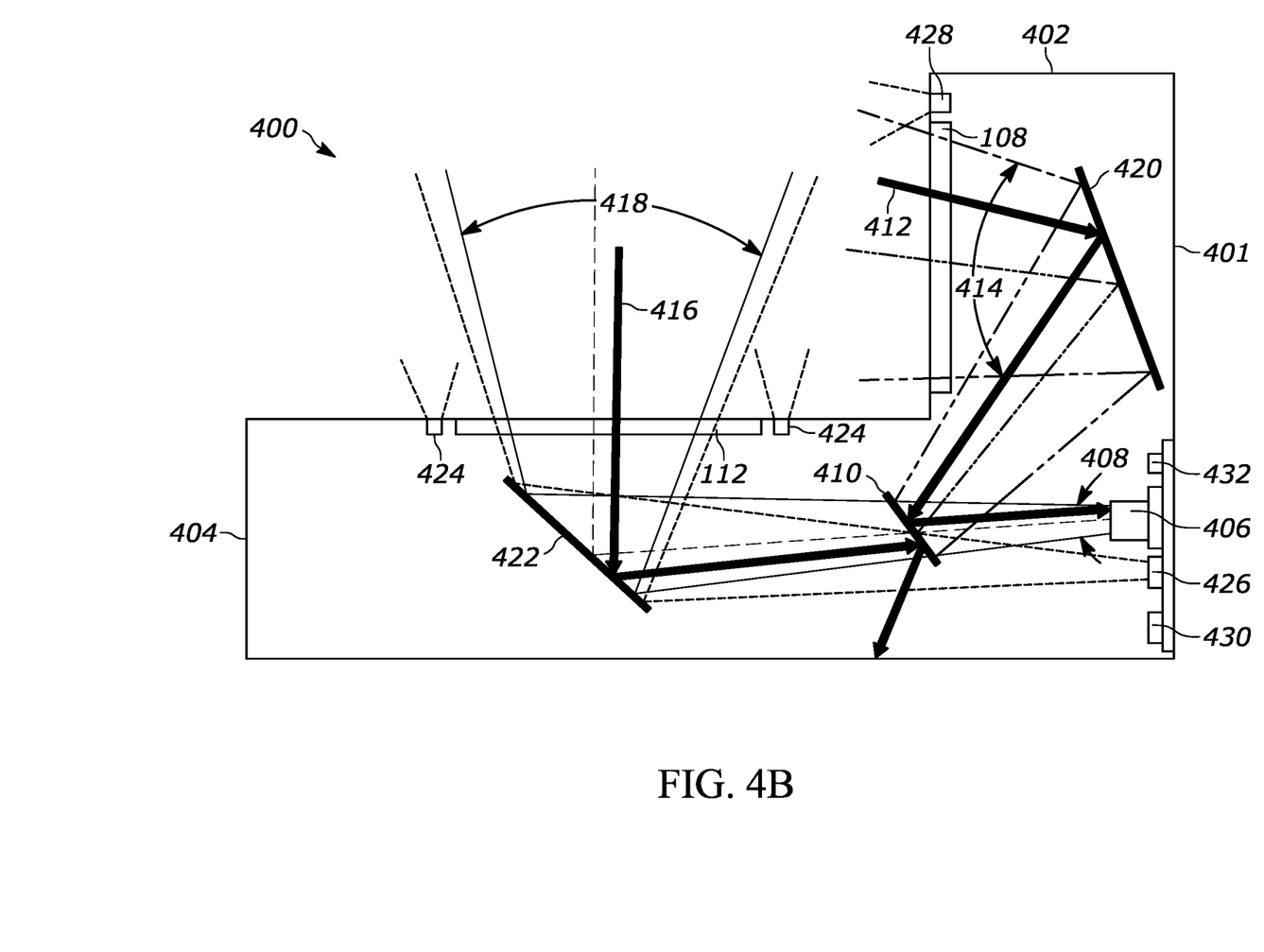

Referring to FIGS. 4A and 4B, shown therein is a side cross-section block diagram of an example bioptic indicia reader 400 which utilizes a dichroic mirror in the bottom portion thereof with illumination assemblies operable to emit illumination of different wavelengths. More specifically, the reader 400 includes a housing 401 with an upper portion 402 and a bottom portion 404. Positioned at least partially within the bottom portion 404 is an imaging assembly 406 which, in the illustrated example, is an imaging assembly operable to generate 2D image data.

A 2D imaging assembly may include an image sensor (also referred to as an imager or imaging sensor) that can be, for example, a two-dimensional CCD or a CMOS sensor that can be either a monochrome sensor or a color sensor having, for instance 1.2 megapixels arranged in a 1200×960 pixel configuration. It should be appreciated that sensors having other pixel-counts (both below and above) are within the scope of this disclosure. These two-dimensional sensors generally include mutually orthogonal rows and columns of photosensitive pixel elements arranged to form a substantially flat square or rectangular surface. Such imagers are operative to detect light captured by an imaging lens assembly along a respective optical path or axis that normally traverses through either of the generally horizontal or generally upright window(s) with the assistance of one or more splitter and/or fold mirrors (also referred to as a mirror arrangement).

As illustrated, the first imaging assembly 406 has associated therewith a FOV 408 that extends from the imaging assembly 406 in a substantially horizontal direction. Positioned within the path of the FOV 408 is a dichroic mirror 410 that reflects light in one wavelength range and allows light in a different wavelength range to pass therethrough. Generally, a dichroic mirror can be made using one or more of: a coating applied to a conventional mirror, film applied to a conventional mirror, or a mirror comprising colored glass. Additionally, if applied material is used it may be applied on either side of the mirror 410.

Employing the dichroic mirror 410 allows light from multiple directions to be directed over the FOV 408. To help illustrate this better, FIG. 4A is shown with the with light 412 received along the FOV 414 and with the light 416 received along the FOV 418 being within the wavelength range that is transmittable through the mirror 410, and FIG. 4B is shown with the with light 412 received along the FOV 414 and with the light 416 received along the FOV 418 being within the wavelength range that is reflected by the mirror 410.

In case of FIG. 4A (and any other implementation of the concepts described herein), it should be appreciated that the specific wavelength ranges selected for the passing/reflecting thresholds of the dichroic mirror and the corresponding features of the dichroic mirror should not be viewed as limiting unless expressly identified with respect to any specific embodiment. As such, in some examples, the reader 400 may be configured such that light in the visible spectrum (e.g., 380 to 700 nanometer (nm)) is passed through the mirror 410 and light in the infrared spectrum (e.g., 780 nm to 1000 nm, or 700 nm to 1000 nm) is reflected by the mirror 410.

Applying these parameters to the illustrated example reader 400, visible light received along the path 412 of FOV 414 is reflected off of a fold mirror 420 positioned in the upper portion 402 and is redirected in a generally downward direction. In the current example, fold mirror 420 is a conventional mirror operative to reflect light of both visible and infrared wavelength spectrums. Once reflected, the visible light continues on a downward path towards the dichroic mirror 410 where it passes through said mirror towards the bottom of the reader housing. To avoid light dissipation from where visible light hits the housing, light-absorbing material may be provided. This could help prevent stray light from unintentionally entering the imaging assembly 406. At the same time, the same visible light traveling along the path 416 of the FOV 418 is reflected off of the fold mirror 422 toward the imaging assembly 406 along a generally horizontal path where, along the way, that encounters the dichroic mirror 410. As with mirror 420, the mirror 422 is a conventional mirror operative to reflect light of both visible and infrared wavelength spectrums. Given that in the present example the dichroic mirror 410 is operative to pass light in the visible spectrum therethrough, light along the path 416 passes through the mirror 410. Although the passing of light along the FOV 418 through the dichroic mirror 410 may introduce minor distortions, such distortions should not be sufficient to prevent acquisition of that light by the imaging assembly 406. Once past the mirror 410, visible light traveling along the FOV 418 continues unimpeded until it reaches the imaging assembly 406 where is it sensed by the appropriate electronic component(s) (e.g., imaging sensor) and image data representative of the environment (comprised of visible light) which appears in FOV 418 is generated therefrom.

The same device arrangement changes its optical characteristics when light that enters the reader 400 along the FOVs 412 and 414 is in the infrared wavelength range. Such operational characteristics are illustrated in FIG. 4B where light in the infrared (IR) spectrum received along the path 412 of FOV 414 is reflected off of a fold mirror 420 in a generally downward direction. Once reflected, the visible light continues on a downward path towards the dichroic mirror 410 where, due to the mirror's exemplary configuration, it is reflected toward the imaging assembly 406 along a generally horizontal direction. It continues unimpeded until the imaging assembly 406 where is it sensed by the appropriate electronic component(s) (e.g., imaging sensor) and image data representative of the environment (comprised of IR light) which appears in FOV 414 is generated therefrom. At the same time, the same IR light traveling along the path 416 of the FOV 418 is reflected off of the fold mirror 422 toward the imaging assembly 406 along a generally horizontal path. However, unlike in the example of FIG. 4A, upon encountering the dichroic mirror 410, IR light traveling along the path 416 (and the rest of the FOV 418) is reflected by the mirror 410 in a generally downward direction. As with the example of FIG. 4A, measures may be put in place to reduce the reflected light from scattering from the housing to reduce stray light from entering the imaging assembly 406.

It should be appreciated that with the example of FIGS. 4A and 4B, the imaging assembly must be able to sense both light in the visible spectrum and light in the IR spectrum. To achieve this, an image sensor comprising both RGB and IR sensitive pixels may be used. In other examples the sensor may be operative to sense visible light via monochrome pixels rather than RGB sensors. However, the use of the concepts described herein extend beyond wavelength ranged in the visible/IR wavelength ranges. Meaning, so long as a sensor is operative to capture wavelengths of different ranges, a dichroic mirror may be used to split the operable wavelength range of the image sensor over multiple FOVs. For instance, an RGB sensor may be employed to capture green light (e.g., in the 500-570 nm range) from one FOV (e.g., FOV 414) and red light (e.g., in the 620-750 nm range) from another FOV (e.g., FOV 418) so long as the dichroic mirror is operative to reflect light in one of those ranges (e.g., the green light) and pass therethrough light in another one of those ranges (e.g., red light). Similarly, the two wavelength ranges can include different shades of one color. For example, the two wavelength ranges may include light from the lower range of the red spectrum (e.g., light in the 600-650 nm range) and light from the upper range of the red spectrum (e.g., light in the 650-750 nm range). Again, such division of wavelength ranges is within the scope the disclosure and would require a configuration where the dichroic mirror is operative to reflect light in one of those ranges and pass therethrough light in another one of those ranges. Along those lines, appropriate illumination in the desired wavelength ranges can be provided via the illumination components of the indicia reader.

To help sufficiently illuminate objects being imaged by the reader 400, various illumination sources may be provided. These illumination sources may be implemented as illumination assemblies 424 positioned along the platter near the generally horizontal window 112, be provided as internal illumination assembly(ies) 426 whereby illumination produced by such assembly would be reflected off any one or more mirrors and directed into the product scanning region of the reader, and/or illumination assembly(ies) 428 positioned near the generally upright window 108. Each of these assemblies could be configured to provide illumination within a specific wavelength range whereby that range would be commensurate with the wavelength range of the light that is being captured over a respective FOV that is being illuminated by the illumination source. For example, considering the earlier example of capturing visible light along FOV 418, illumination assemblies 424 may be configured to provide visible light so as to provide illumination of the object. Along those lines, illumination assemblies 428 may be operative to provide light in the IR wavelength range so as to effectively illuminate the object in the product scanning region and capture the IR light reflected therefrom along the FOV 414.

Alternatively or in combination with, a band-pass filter may be provided anywhere along the way of any of the FOVs. For instance, a wavelength filter positioned in front of the imaging assembly may be configured to filter out all but the necessary wavelength ranges. In other cases, the filter may be integrated into the windows 108 and/or 112. In some instances, in addition to or in place of optical filters positioned on the inbound optical path(s), one or more filters may be used in connection with any of the illumination assemblies to provide illumination light in the appropriate wavelength.

It should be noted that the configuration described herein includes the advantage of not having to stager image acquisition along the different FOVs. Meaning, image data from along both FOVs (e.g., 414 and 418) can be acquired as the same time. This further leads to the activation of the respective illumination assemblies at the same time, potentially reducing perceived flickering.

Operational aspects of the reader 400 may be controlled via a controller (also referred to as a processor) 430 that may execute instructions stored in a memory 432. These components are communicatively coupled to other elements like the imaging assembly and the illumination assembly(ies). It should also be appreciated that that while only one imaging assembly is illustrated, multiple assemblies with respective mirror arrangements may be used. Additionally, other mirror configuration (with more or less mirrors) are within the scope of the present disclosure.

Figure 5:
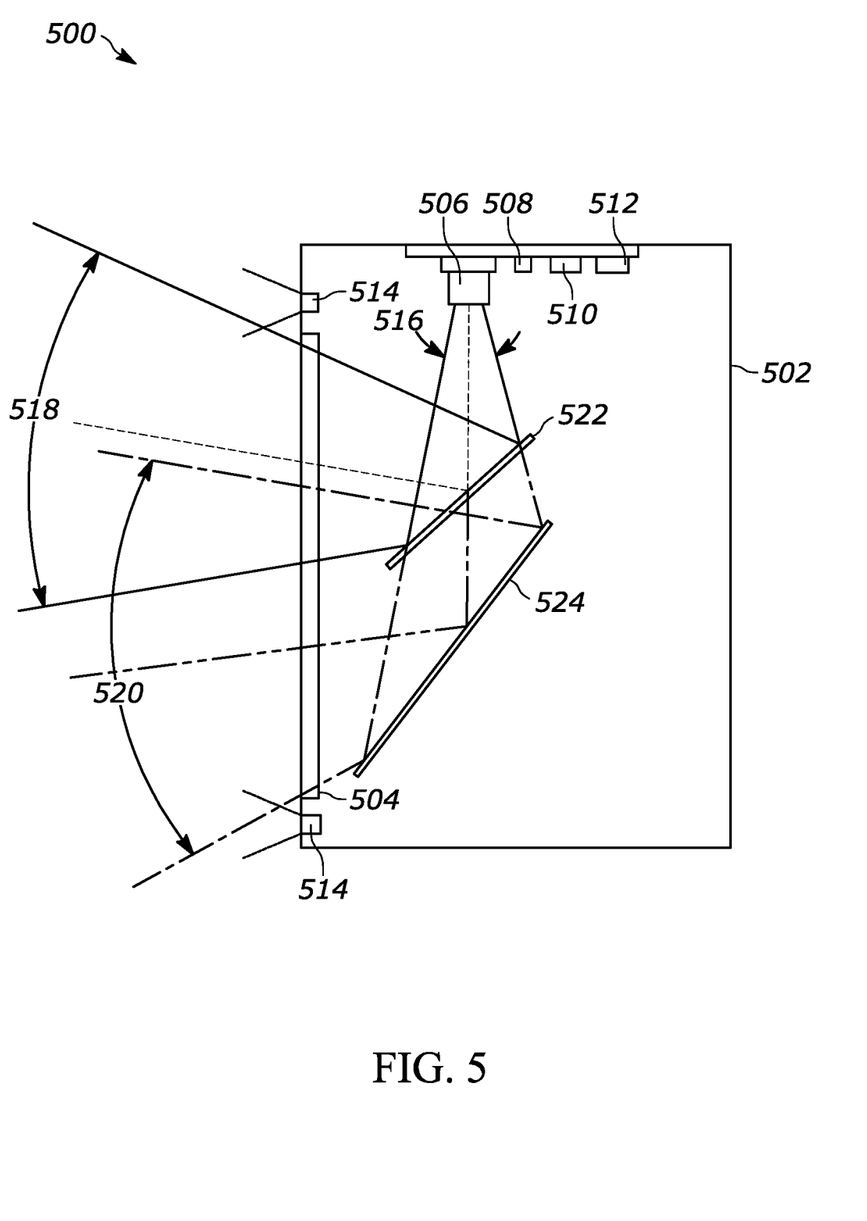
FIG. 5 illustrates a side-cross-section block diagram of an example slot scanner indicia reader in accordance with an embodiment of the present disclosure.

FIG. 5 illustrates one such example of an indicia reader 500 which, represented as a cross-section block diagram of a slot scanner commonly used as a moveable scanner positioned on a countertop, installed in a recessed position within a countertop, or otherwise installed in a kiosk. The reader 500 includes a reader housing 502 with a window. Positioned internally on a printed circuit board are an imaging assembly 506, illumination assembly 508, controller 510 (with a decoder for decoding a payload of an indicia that may be present in any respective image data), and memory 512. Additionally, one or more illumination assemblies may be positioned near the window 504. The imaging assembly 506 includes a primary FOV 516 which is split, by way of wavelength ranges, into FOV 518 and FOV 520. This split is achieved via a dichroic mirror positioned within the path of the FOV 516.

Generally speaking, it should be appreciated that parts that are similar to the reader of the prior embodiment may operate in a same/similar manner as the parts described in connection with the prior embodiment. As such, the dichroic mirror 522 is used to selectively permit light of certain wavelength therethrough and to further reflect light in another wavelength rage. For example, assuming that the two wavelength ranges are the visible range and the IR range, as in the prior example, the mirror 522 may be operative to reflect light in the IR range and to allow light in the visible range to pass therethrough. With such configuration, IR light received along the FOV 518 is reflected by mirror 522 and is captured by the imaging assembly 506 as respective image data. At the same time, visible light received over the FOV 520 is reflected off the conventional fold mirror 524 and if then passed through the dichroic mirror 522 towards the imaging assembly 506 where it too is captured as respective image data. As with the prior example, illumination assembly(ies) 514 may be used to provide the necessary illumination within the wavelength rages of interest.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAS, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal. Additionally, references to "substantially_direction" or a "generally_direction" shall be understood to be within 45 degrees a path in that direction. For example, a path extending along a generally or substantially horizontal direction shall be understood to mean a path that is within 45 degrees of horizontal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An image capture system for performing at least one machine vision operation on captured image data, the image capture system comprising:
a housing;
an imaging assembly positioned within the housing, the imaging assembly having an imaging sensor, the imaging assembly further having associated therewith a primary field of view (FOV) which is projected onto an area of the imaging sensor such that the imaging sensor is operative to capture image data representative of light that impinges on the area of the imaging sensor, the imaging sensor configured to capture the image data responsive to sensing light in a first wavelength range and in a second wavelength range, the primary FOV having a vertical angle and a horizontal angle; and a mirror arrangement including a first mirror positioned within a path of the primary FOV and operative to (i) reflect light in the first wavelength range forming a first sub-FOV and (ii) pass therethrough light in the second wavelength range forming a second sub-FOV, wherein each of a vertical angle of the first sub-FOV and a vertical angle of the second sub-FOV is the same as the vertical angle of the primary FOV, and wherein each of a horizontal angle of the first sub-FOV and a horizontal angle of the second sub-FOV is the same as the horizontal angle of the primary FOV.

2. The image capture system of claim 1, further comprising an indicia-decoding module, and wherein the at least one machine vision operation on the captured image data includes analyzing the captured image data by the indicia-decoding module.

3. The image capture system of claim 1, further comprising a second mirror positioned within a path of the second sub-FOV, the second mirror configured to reflect light in the second wavelength range.

4. The image capture system of claim 3, further comprising a third mirror positioned within a path of the first sub-FOV, the third mirror configured to reflect light in the first wavelength range.

5. The image capture system of claim 4, wherein the second mirror directs the second sub-FOV towards a product scanning region of the image capture system along one of a generally upright direction or a generally horizontal direction, and wherein the third mirror directs the first sub-FOV towards the product scanning region of the image capture system along another of the generally upright direction or the generally horizontal direction.

6. The image capture system of claim 5, wherein the housing includes (i) a lower portion having a top surface with a first window facing the product scanning region and a (ii) an upper portion extending above the lower portion, the upper portion having a second window facing the product scanning region, wherein the first sub-FOV is directed through the first window, and wherein the second sub-FOV is directed through the second window.

7. The image capture system of claim 1, wherein the first mirror is a dichroic mirror.

8. The image capture system of claim 1, wherein the first wavelength range includes light in at least a portion of a 700 to 1000 nanometer range, and wherein the second wavelength range include light in at least a portion of a 380 to 700 nanometer range.

9. The image capture system of claim 1, wherein each of the first wavelength range and the second wavelength range includes light in at least a portion of a 550 to 750 nanometer range, and wherein the first wavelength range does not entirely overlap with the second wavelength range.

10. The image capture system of claim 1, further comprising a first illumination source configured to emit light in the first wavelength range and a second illumination source configured to emit light in the second wavelength range.

11. The image capture system of claim 1, wherein the image capture system is selectively operable in one of a suspended mode and a reading mode, and wherein indicia-reading apparatus is configured to transition from the suspended mode to the reading mode based analyzing image data captured in response to sensing the light in the first wavelength range.

12. The image capture system of claim 11, wherein in the suspended mode at least one of an illumination assembly and the imaging assembly operates at a reduced functionality than in the reading mode.

* * * * *